United States Patent [19]

Rush

[11] Patent Number: 4,948,392

[45] Date of Patent: Aug. 14, 1990

[54] HEAT INPUT FOR THERMAL REGENERATIVE DESICCANT SYSTEMS

[75] Inventor: William F. Rush, Park Ridge, Ill.

[73] Assignee: Institute of Gas Technology, Chicago, Ill.

[21] Appl. No.: 385,225

[22] Filed: Jul. 25, 1989

[51] Int. Cl.[5] ............................................. B01D 53/06
[52] U.S. Cl. ............................................ 55/34; 55/60; 55/78; 55/208; 55/390
[58] Field of Search .................... 55/34, 60, 78, 181, 55/208, 390

[56] References Cited

U.S. PATENT DOCUMENTS

| | | | |
|---|---|---|---|
| 2,723,837 | 7/1951 | Pennington | 55/390 X |
| 2,926,502 | 7/1955 | Munters et al. | 55/181 X |
| 3,889,742 | 6/1975 | Rush et al. | 165/7 |
| 4,231,764 | 11/1980 | Mattia | 55/60 X |
| 4,409,006 | 10/1983 | Mattia | 55/60 X |
| 4,529,420 | 7/1985 | Norbäck | 55/181 |
| 4,594,860 | 6/1986 | Coellner et al. | 55/390 X |
| 4,595,403 | 6/1986 | Sago et al. | 55/389 |
| 4,612,022 | 9/1986 | Berry | 55/60 |
| 4,729,774 | 3/1988 | Cohen et al. | 55/181 |
| 4,775,484 | 10/1988 | Schmidt et al. | 55/78 X |
| 4,846,855 | 7/1989 | Tsujimoto | 55/60 |

FOREIGN PATENT DOCUMENTS 56-073525 6/1981 Japan ........................ 55/181

Primary Examiner—Robert Spitzer
Attorney, Agent, or Firm—Thomas W. Speckman; Douglas H. Pauley

[57] ABSTRACT

An apparatus and process for heating a regeneration stream in a thermal regenerative desiccant system having a process stream and a regeneration stream in which a desiccant component rotates through both the process and regeneration streams. The regeneration stream providing the heat required for regeneration of the desiccant is separately heated by each of a plurality of adjacent regeneration stream segments being independently heated. When desired to reduce the total heat provided the regeneration stream, the heat is first reduced only in a first of the regeneration segments contacting the desiccant component as it rotates from the process stream to the regeneration stream. The heat supplied to the first segment is further reduced until it is completely discontinued. Then when still less heat is required for regeneration, heat is reduced to a second adjacent regeneration stream radial segment until it is completely discontinued. Heat reduction may be continued sequentially across adjacent radial segments to meet the heat requirements for regeneration.

32 Claims, 2 Drawing Sheets

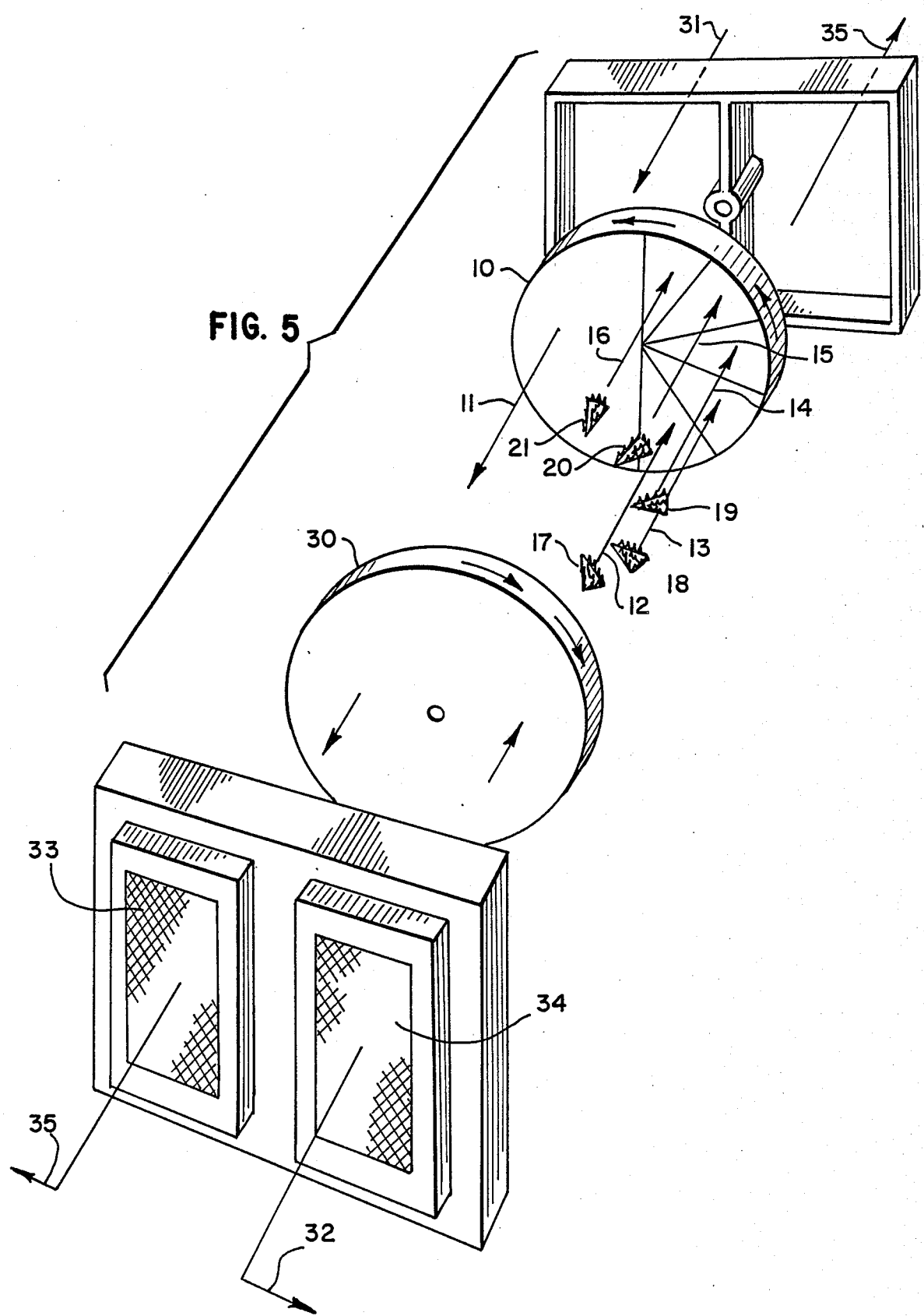

HEAT INPUT FOR THERMAL REGENERATIVE DESICCANT SYSTEMS

BACKGROUND OF THE INVENTION

1. Field of the Invention

The present invention relates to improvements in thermal regenerative desiccant apparatus and processes wherein desiccant elements move cyclically between process and regenerative gas streams. This invention involves separately heating each of a plurality of regeneration stream radial segments in a manner so that reduction from maximum thermal energy input is achieved by first reducing heat only in the first regeneration stream radial segment first contacting the desiccant element as it rotates from the process stream to the regeneration stream. When the heat supplied to the first regeneration stream segment has been completely discontinued, then for further reduction of heat, the heat supplied to only a second regeneration stream radial segment adjacent the first regeneration stream segment is reduced, and the reduction process continued sequentially across adjacent radial segments until desired total thermal energy input to the regeneration stream is achieved. The process of this invention for improved thermal desiccant regeneration is suitable for use in drying applications as well as in open cycle air conditioning apparatus and methods.

2. Description of the Prior Art

Thermally regenerated desiccant wheels are used in open cycle air conditioning systems as generally disclosed in U.S. Pat. No. 2,723,837, Neal A. Pennington and U.S. Pat. No. 2,926,502, C. G. Munters, et al. These desiccant wheels are regenerated by a regenerative air stream heated by means of an external heat source to a temperature sufficiently high to regenerate the hygroscopic material of the drying wheel passed in thermal exchange relation. U.S. Pat. No. 4,595,403 teaches regeneration of a desiccant wheel having ceramic fiber matrix with interstices filled with molecular sieves by heating the entire high temperature regeneration stream by burning gas in a heater.

U.S. Pat. No. 3,889,742, teaches staged heating which utilizes low level thermal energy from waste heat or solar sources applying heat to the entire regeneration stream and a high-temperature heater applying heat to the latter portion of the regeneration stream passing through the regeneration portion of the drying wheel of an open-cycle air conditioning system.

U.S. Pat. No. 4,729,774 discloses a method of regenerating desiccant beds or wheels by profiling the temperature of the regeneration air stream in a non-uniform manner over the surface area of the regeneration side of a desiccant component. The 4,729,774 patent teaches that the first portion of the regeneration stream seen by a revolving desiccant wheel is at a low temperature, the outlet temperature of the heat exchanger, and the heat may be increased in a staged manner or in a continuously increasing manner, so that the portion of the regeneration stream which the desiccant wheel sees last is at the highest temperature immediately prior to the desiccant wheel passing into the process air stream. The 4,729,774 patent teaches the desirability of the temperature profile of the regeneration side of the desiccant wheel corresponding to that of the process side. This is accomplished by means of direct thermal transfer from corresponding segments of the process stream side to the corresponding segments of the regeneration stream side which may be achieved through a stratified heat exchanger and baffle configurations in the regeneration stream. Any reduction in thermal input to the regeneration stream as taught by the 4,729,774 patent is effected across the entire regeneration stream.

U.S. Pat. No. 4,594,860 discloses an open cycle air-conditioning apparatus having a moisture transfer wheel and a heat exchanger wheel with baffles in the process stream between the moisture transfer wheel and the heat exchanger wheel to prevent undesirable mixing of process stream air at different temperature and humidity levels exiting from the desiccant wheel and passing to the heat exchange wheel.

SUMMARY OF THE INVENTION

This invention provides an apparatus and process for regeneration of thermally regenerative desiccant systems by separately heating each of a plurality of regeneration stream adjacent radial segments to a generally constant heat flux by a plurality of independently controlled heat sources, each heat source providing heat uniformly to one of the regeneration stream adjacent radial segments. When it is desired to reduce the total heat provided to the regeneration stream as required to meet total heat requirements for regeneration of the desiccant component, this reduction is achieved by reducing heat only to a first segment of the plurality of regeneration stream adjacent radial segments until no heat is applied to the first segment, the first segment contacting a first portion of the desiccant component as the first portion of the desiccant rotates from the process stream to the regeneration stream. Then when further heat reduction is required to provide the heat required to regenerate the desiccant component, reducing heat only to an adjacent second segment of the plurality of regeneration stream adjacent radial segments until no heat is applied to the second segment, and continuing sequentially reducing heat only to further adjacent segments of the plurality of regeneration stream segments until the total regeneration heat required is provided. In a preferred embodiment each of the plurality of regeneration stream adjacent radial segments is separately heated by at least one independently controlled open flame burner. In another preferred embodiment the segment of the plurality of regeneration stream adjacent radial segments last contacting the desiccant component and adjacent the process stream is not provided with heat, having the effect of cooling a portion of the desiccant component and removing combustion products before entering the process stream.

The regeneration stream adjacent radial segments may rely upon laminar flow or may have radial partitions to provide separation of the regeneration stream segments.

An object of this invention is to provide an apparatus and process to more effectively apply regeneration heat input to the thermal regenerative stream for thermal regenerative desiccant systems.

Another object of this invention is to provide an improved apparatus and process for open-cycle air-conditioning, heating and cooling.

A further object of this invention is to provide an apparatus and process for separately heating each of a plurality of regeneration stream adjacent radial segments to a generally constant heat flux by a plurality of independently controlled heat sources and for reduction of the total heat supplied to the regeneration stream in a manner to provide a more effective regenerated desiccant component to a process stream.

BRIEF DESCRIPTION OF THE DRAWINGS

Various means for practicing the invention and other advantages and novel features thereof will be apparent from the following detailed description of preferred embodiments and reference to the drawings, in which like reference numerals denote like elements, wherein:

FIG. 5 is a schematic representation of an open-cycle air-conditioning apparatus according to one embodiment of this invention.

DETAILED DESCRIPTION OF PREFERRED EMBODIMENTS

Figure 1:
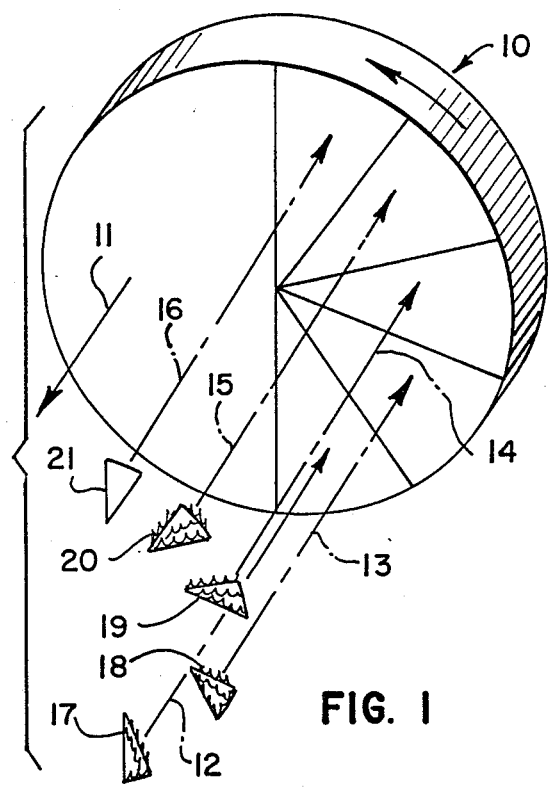
FIG. 1 is a schematic representation of a regenerative desiccant system according to one embodiment of this invention having a plurality of five regeneration stream adjacent radial segments through which the desiccant component rotates cyclically between a process stream and a regeneration stream.

FIG. 1 shows a regenerative desiccant system wherein the desiccant means is desiccant wheel 10 which rotates cyclically through process stream 11 and a plurality of five regeneration stream adjacent radial segments: 12, 13, 14, 15 and 16. Each of the plurality of adjacent radial stream segments 12, 13, 14, 15 and 16 may be separately heated to a generally constant heat flux by a plurality of independently controlled heat sources shown as burners 17, 18, 19, 20 and 21. In this embodiment, each heat source may provide heat to one regeneration stream segment, heat source 17 heats only regeneration stream segment 12, heat source 18 heats only regeneration stream segment 13, heat source 19, heat source 20 and heat source 21 heating only regeneration stream segments 14, 15 and 16, respectively. Thermal energy in adjacent regeneration stream segments is at a generally constant heat flux except in a segment in which the heat is reduced due to lowered total heat requirement for desiccant regeneration. Although not shown in the drawings, a blower means for maintaining flow of the regenerative streams and process stream is required. In the embodiment shown in FIG. 1, thermal separation of the radial stream segments is maintained by generally laminar flow of the entire regeneration stream. Also shown in FIG. 1, is that no heat is applied to segment 16, the segment of regeneration stream adjacent radial segments last contacting the desiccant component and adjacent the process stream. This has the effect of cooling the desiccant component and removing combustion products prior to entering the process stream. Cooling of the desiccant component at this stage results in more effective drying in the process stream 11.

While five regeneration air stream radial segments and heat sources are shown in FIG. 1, the regeneration stream segments and corresponding heat sources may number from two to about twelve, about three to about six being preferred. Each heat source forms or is located in a separate regeneration stream radial segment. The heat sources may heat the regeneration stream radial segments directly or indirectly. Direct heating by open flame is preferred. Fuel for the heat sources may comprise any combustible gases or liquids or the heat sources may comprise electric heating elements, waste heat, or solar heat or any combination of these sources. When open flame combustion is used for direct heating of regeneration stream radial segments which are maintained by laminar flow, as shown in FIG. 1, the burner is preferably of a design to apply heat in a generally even manner over the area of its corresponding regeneration stream radial segment.

Suitable control means for independent control of the plurality of heat means may be any such control means as known to the art. For example, when using natural gas burners, a temperature sensing means may be placed in each regeneration stream radial segment and using these temperature inputs the control means adjusts gas and air supplied to each burner in a manner to provide a relatively constant heat flux to the full heat regeneration stream adjacent radial segments and to provide reduced or no heat to reduced heat regeneration stream radial segments in a manner to provide the required regeneration heat to the regeneration stream. The control means reduces fuel supply sequentially to the burners in the first, then second, and in further such sequence to burners in the regeneration stream adjacent radial segments.

The terminology "heat source" as used throughout this disclosure and claims also means ducted flow of heated air from a single heating means, such as a single flame exterior to the regenerative stream, to each regeneration stream radial segment in a manner to provide constant heat flux and reduction in heat applied to the first, then second, and further sequential regeneration stream radial segments as described above. Various suitable ducting, valving, temperature sensing and control means for achievement of such flow and heat application will be apparent to one skilled in the art in view of the above disclosure. An important aspect of this invention is control of the temperature profile across the regeneration stream in the above described fashion, regardless of the manner of its achievement.

Figure 2:
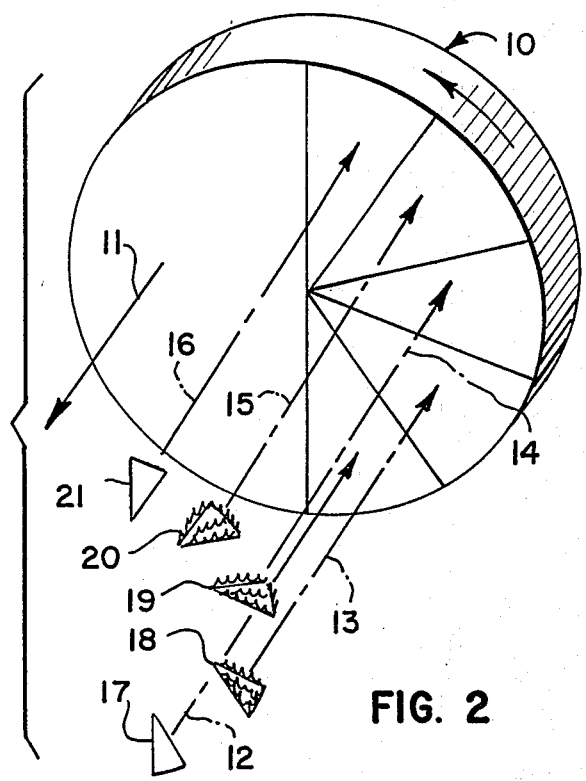
FIG. 2 is a schematic representation of the regenerative desiccant system of FIG. 1 showing heating to the first regeneration stream radial segment reduced to zero.
Figure 3:
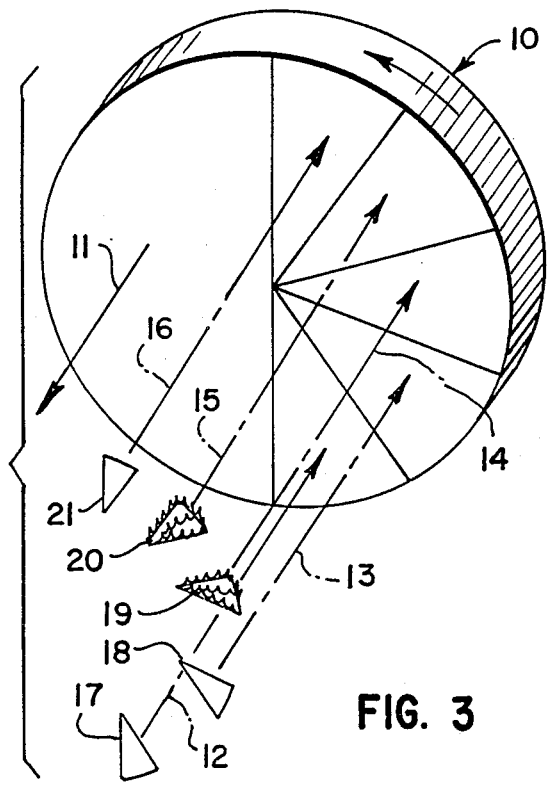
FIG. 3 is a schematic representation of the regenerative desiccant system of FIG. 1 showing heating to the first and second adjacent segments reduced to zero.

FIG. 2 schematically shows the regenerative desiccant systems as shown in FIG. 1, except that the total heat provided to the regeneration stream is reduced to meet heat requirements for regeneration of the desiccant component by reducing to zero heat source 17 applying heat only to first radial segment 12 of the plurality of regeneration stream adjacent radial segments. When further reduction of total heat provided to the regeneration stream is desired to meet heat requirements for regeneration of the desiccant component, application of heat to the second next adjacent radial segment 13 of the plurality of regeneration stream adjacent radial segments is reduced until heat source 18 is reduced to zero as shown in FIG. 3. As shown in FIG. 3, the total heat provided to the regeneration stream is reduced by reducing only heat sources 17 and 18 in regeneration stream radial segments 2 and 13, respectively. Although not shown in the drawings, heat sources 19, 20 and 21 may each be sequentially reduced to apply less heat first to regeneration stream radial segment 14 until the heat provided is zero and then to regeneration stream radial segments 15 and 16 to meet the required heat requirements for regeneration of the desiccant 11.

Figure 4:
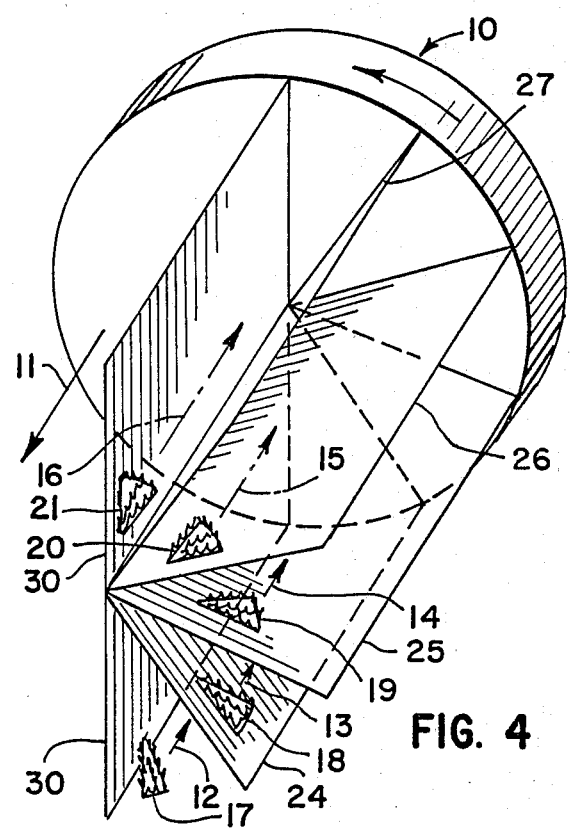
FIG. 4 is a schematic representation of another embodiment showing regeneration stream adjacent radial segments separated by radial partitions.

FIG. 4 shows an embodiment for heating regeneration stream adjacent radial segments which are separated by radial partitions. Five regeneration stream adjacent radial segments 12, 13, 14, 15 and 16 are maintained separated by radial partitions 24, 25, 26 and 27 with partition 30 separating process stream 11 from the regeneration stream radial segments. The radial partitions provide more accurate and precise distribution of heat by the regeneration stream adjacent radial segments.

Regeneration air flow is provided to each regeneration stream adjacent radial segment regardless of whether heat is provided to each regeneration stream adjacent radial segment. That is, when the heat source to a regeneration stream radial segment is reduced or turned off, the regeneration air flow to that regeneration stream radial segment continues in its ambient or unheated condition. It is readily apparent that when open flame combustion provides heat, the air flow must be sufficient to provide combustion air in addition to required regeneration air flow.

It is an important feature of this invention that the heating profile across the regeneration stream can be controlled independently from the thermal profile across the process stream. The process and apparatus of this invention provides thermal adjustment of the regeneration stream to provide the desired heating profile across the regeneration stream dependent upon the incoming regeneration stream condition while the process stream is controlled by desired output conditions.

The process of this invention for heating a regeneration stream in a thermal regenerative desiccant system having a process stream and a regeneration stream through which a desiccant means passes, the desiccant means rotating to cyclically pass through the process stream and said regeneration stream, the regeneration stream providing heat required for regeneration of the desiccant means, comprises the steps of: (a) separately heating each of a plurality of regeneration stream adjacent radial segments to a generally constant heat flux by a plurality of independently controlled heat sources, each heat source providing heat to one of the regeneration stream adjacent radial segments; (b) reducing the total heat provided to the regeneration stream when required to meet heat requirements for regeneration of the desiccant means by applying reduced heat only to a first segment of the plurality of regeneration stream adjacent radial segments, the first segment first contacting the desiccant means as it rotates from the process stream to the regeneration stream, applying further reduced heat to the first segment when required to meet heat requirements for regeneration of said desiccant means until no heat is supplied to the first segment of the regeneration stream; (c) then when required to obtain the reduction in said total heat provided to meet heat requirements for regeneration of the desiccant means, applying reduced heat only to an adjacent second segment of the plurality of regeneration stream adjacent radial segments next contacting the desiccant means as the desiccant means continues rotation through the adjacent second regeneration stream radial segment, applying further reduced heat to the second segment when required to meet heat requirements for regeneration of the desiccant means until no heat is supplied to the second segment of the regeneration stream; and (d) continuing sequentially applying reduced heat to meet heat requirements for regeneration of the desiccant means to further adjacent segments of the plurality of regeneration stream segments until the required regeneration heat has been provided.

An apparatus for heating a regeneration stream in a thermal regenerative desiccant system having duct means separating a process stream and a regeneration stream through which a desiccant means passes, the desiccant means rotating to cyclically pass through the process stream and the regeneration stream, the regeneration stream providing heat required for regeneration of the desiccant means, comprises: (a) a plurality of independently controlled heat source means separately heating each of a plurality of regeneration stream adjacent radial segments to a generally constant heat flux, each said heat source means providing heat to one of the regeneration stream adjacent radial segments; and (b) control means independently controlling each said heat source means for reducing the total heat provided to the regeneration stream when required to meet heat requirements for regeneration of the desiccant means by reducing heat output only of a first heat source means to a first segment of the plurality of regeneration stream adjacent radial segments, the first segment first contacting the desiccant means as it rotates from the process stream to the regeneration stream, further reducing heat output of the first heat source means when required to meet heat requirements for regeneration of the desiccant means until no heat is supplied by the first heat source means to the first segment of the plurality of regeneration stream adjacent radial segments; the control means then when required to obtain the reduction in total heat provided to meet heat requirements for regeneration of the desiccant means, reducing heat output of a second said heat source means to a adjacent second segment of the plurality of regeneration stream adjacent radial segments next contacting the desiccant means as it continues rotation through the adjacent second regeneration stream radial segment, further reducing heat output of the second heat source means when required to meet heat requirements for regeneration of the desiccant means until no heat is supplied by the second heat source means to the second segment of the regeneration stream; and the control means continuing sequentially reducing heat output of further adjacent heat source means to meet heat requirements for regeneration of the desiccant means to further adjacent segments of the plurality of regeneration stream segments until required regeneration heat has been provided.

FIG. 5 schematically shows an open-cycle air conditioning apparatus utilizing one embodiment of this invention for heating the regeneration stream. As shown in FIG. 5, the desiccant component is desiccant wheel 10 which is downstream in the regeneration stream from sensible heat exchange wheel 30. Sensible heat exchange wheel 30 and desiccant wheel 10 rotate in opposite directions, as indicated by the arrows, between the regeneration stream segments 12, 13, 14, 15, and 16 and process stream 11. Although not shown in the drawings, blower means for flowing the air through the system is required. The regeneration stream is divided into a plurality o regeneration stream adjacent radial segments 12, 13, 14, 15 and 16 with heat source means 17, 18, 19, 20 and 21 each providing heat to one of the regenerative air streams, respectively in the manner more fully set forth above.

Referring to FIG. 5, the open cycle air-conditioning system is illustrated in a full ventilation mode wherein ambient air from the atmosphere 31 enters the apparatus as process stream 11 passing in sequence through desiccant wheel 10, sensible heat exchange wheel 30 and humidifier 33 into the room to be conditioned as conditioned air stream 35. Room air stream 32 from the conditioned room passes in sequence through humidifier 34, sensible heat exchange wheel 30, regeneration air stream adjacent radial segments 12, 13, 14, 15 and 16, heated by independently controlled heat source means 17, 18, 19, 20 and 21 respectively, which heat desiccant wheel 10 in the desired thermal profile by passing through it in segmented fashion and are exhausted to the ambient environment in exhaust stream 35. Instead of ambient air stream 31, room air may be recirculated. Combinations of the recirculating and ventilation mode may also be utilized. For operation of the apparatus and process in the cooling and heating modes, it is generally preferred to utilize the ventilating mode of operation. Both cooling and heating modes can also be operated under the full recirculating mode or a combination of ventilating and recirculating modes.

The improved open-cycle air conditioning method for heating and cooling according to this invention comprises the steps of treating a process stream by heating and cooling as desired and of heating a regeneration air stream prior to passing through a desiccant means rotating to cyclically pass through the process air stream and the regeneration air stream, the regeneration air stream providing heat required for regeneration of the desiccant means, wherein the improvement comprising the steps of: (a) separately heating each of a plurality of regenerative air stream adjacent radial segments to a generally constant heat flux by a plurality of independently controlled heat sources, each heat source providing heat to one of the regenerative air stream adjacent radial segments; (b) reducing the total heat provided to the regenerative air stream when required to meet heat requirements for regeneration of the desiccant means by applying reduced heat only to a first segment of the plurality of regenerative air stream adjacent radial segments, the first segment first contacting the desiccant means as it rotates from the process air stream to the regenerative air stream, applying further reduced heat to the first segment when required to meet heat requirements for regeneration of the desiccant means until no heat is supplied to the first segment of the regenerative air stream; (c) then when required to obtain the reduction in total heat provided to meet heat requirements for regeneration of the desiccant means, applying reduced heat only to an adjacent second segment of said plurality of regenerative air stream adjacent radial segments next contacting the desiccant means as the desiccant means continues rotation through the adjacent second regenerative air stream radial segment, applying further reduced heat to the second segment when required to meet heat requirements for regeneration of the desiccant means until no heat is supplied to the second segment of the regenerative air stream; and (d) continuing sequentially applying reduced heat to meet heat requirements for regeneration of the desiccant means to further adjacent segments of the plurality of regenerative air stream segments until regeneration heat required has been provided.

The improved open-cycle air conditioning apparatus for heating and cooling according to this invention comprises: an enclosure defining a process air passageway and a separate regeneration air passageway; means for passing an air stream through each of the passageways; a sensible heat exchanger means for transfer of thermal energy from one of the passageways to the other; a rotatable desiccant means for transfer of moisture from the process air stream to the regeneration air stream and spaced toward the exhaust of the regeneration air stream from the heat exchanger means, the regeneration air stream providing heat required for regeneration of the desiccant means; wherein the improvement comprises: (a) a plurality of independently controlled heat source means separately heating a plurality of regenerative air stream adjacent radial segments to a generally constant heat flux, each heat source means providing heat to one of the regenerative air stream adjacent radial segments; and (b) control means independently controlling each heat source means for reducing the total heat provided to the regeneration air stream when required to meet heat requirements for regeneration of the desiccant means by reducing heat output only of a first heat source means to a first segment of the plurality of regeneration air stream adjacent radial segments, the first segment first contacting the desiccant means as it rotates from the process air stream to the regeneration air stream, further reducing heat output of the first heat source means when required to meet heat requirements for regeneration of the desiccant means until no heat is supplied by the first heat source means to the first segment of the plurality of regeneration stream adjacent radial segments; the control means then when required to obtain the reduction in total heat provided to meet heat requirements for regeneration of the desiccant means, reducing heat output of a second heat source means to an adjacent second segment of the plurality of regenerative air stream adjacent radial segments next contacting the desiccant means as the desiccant means continues rotation through the adjacent second regenerative air stream radial segment, further reducing heat output of the second heat source means when required to meet heat requirements for regeneration of the desiccant means until no heat is supplied by the second heat source means to the second segment of the regenerative air stream; and the control means continuing sequentially reducing heat output of further adjacent heat source means to meet heat requirements for regeneration of the desiccant means to further adjacent segments of the plurality of regenerative air stream segments until regeneration heat required has been provided.

While in the foregoing specification this invention ha been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A method of heating a regeneration stream in a thermal regenerative desiccant system having a process stream and a regeneration stream through which a desiccant means passes, said desiccant means rotating to cyclically pass through said process stream and said regeneration stream, said regeneration stream providing heat required for regeneration of said desiccant means, said process comprising the steps of:
   (a) separately heating each of a plurality of regeneration stream adjacent radial segments to a generally constant heat flux by a plurality of independently controlled heat sources, each said heat source providing heat to one of said regeneration stream adjacent radial segments;

(b) reducing the total heat provided to said regeneration stream when required to meet heat requirements for regeneration of said desiccant means by applying reduced heat only to a first segment of said plurality of regeneration stream adjacent radial segments, said first segment first contacting said desiccant means as it rotates from said process stream to said regeneration stream, applying further reduced heat to said first segment when required to meet heat requirements for regeneration of said desiccant means until no heat is supplied to said first segment of said regeneration stream;

(c) then when required to obtain the reduction in said total heat provided to meet heat requirements for regeneration of said desiccant means, applying reduced heat only to an adjacent second segment of said plurality of regeneration stream adjacent radial segments next contacting said desiccant means as said desiccant means continues rotation through adjacent said second regeneration stream radial segment, applying further reduced heat to said second segment when required to meet heat requirements for regeneration of said desiccant means until no heat is supplied to said second segment of said regeneration stream; and (d) continuing sequentially applying reduced heat to meet heat requirements for regeneration of said desiccant means to further adjacent segments of said plurality of regeneration stream segments until said regeneration heat required has been provided.

2. A method in accordance with claim 1, wherein said independently controlled heat source comprises an open flame burner within each said regeneration stream adjacent radial segment.

3. A method in accordance with claim 1 wherein, separately heating two to about twelve said regeneration stream adjacent radial segments provides said regeneration heat required.

4. A method in accordance with claim 1 wherein, separately heating about three to about six said regeneration stream adjacent radial segments provides said regeneration heat required.

5. A method in accordance with claim 1, wherein said regeneration stream adjacent radial segments are maintained separated by laminar flow of said regeneration stream.

6. A method in accordance with claim 1, wherein no heat is applied to said first segment of said plurality of said regeneration stream adjacent radial segments.

7. A method in accordance with claim 6, wherein reduced heat is applied to said second segment of said plurality of said regeneration stream adjacent radial segments.

8. A method in accordance with claim 1, wherein no heat is applied to the last segment of said regeneration stream adjacent radial segments contacting said desiccant means as it rotates from said regeneration stream to said process stream.

9. A method in accordance with claim 8, wherein said last segment of said regeneration stream segments is sufficient to remove combustion products produced by said heat source comprising open flame burners.

10. In an open-cycle air conditioning method for heating and cooling comprising the steps of treating a process stream by heating and cooling as desired and of heating a regeneration air stream prior to passing through a desiccant means rotating to cyclically pass through said process air stream and said regeneration air stream, said regeneration air stream providing heat required for regeneration of said desiccant means, the improvement comprising the steps of:

(a) separately heating each of a plurality of regenerative air stream adjacent radial segments to a generally constant heat flux by a plurality of independently controlled heat sources, each said heat source providing heat to one of said regenerative air stream adjacent radial segments;

(b) reducing the total heat provided to said regenerative air stream when required to meet heat requirements for regeneration of said desiccant means by applying reduced heat only to a first segment of said plurality of regenerative air stream adjacent radial segments, said first segment first contacting said desiccant means as it rotates from said process air stream to said regenerative air stream, applying further reduced heat to said first segment when required to meet heat requirements for regeneration of said desiccant means until no heat is supplied to said first segment of said regenerative air stream;

(c) then when required to obtain the reduction in said total heat provided to meet heat requirements for regeneration of said desiccant means, applying reduced heat only to an adjacent second segment of said plurality of regenerative air stream adjacent radial segments next contacting said desiccant means as said desiccant means continues rotation through said adjacent second regenerative air stream radial segment, applying further reduced heat to said second segment when required to meet heat requirements for regeneration of said desiccant means until no heat is supplied to said second segment of said regenerative air stream; and (d) continuing sequentially applying reduced heat to meet heat requirements for regeneration of said desiccant means to further adjacent segments of said plurality of regenerative air stream segments until said regeneration heat required has been provided.

11. A method in accordance with claim 10, wherein said independently controlled heat source comprises an open flame burner within each said regeneration stream adjacent radial segment.

12. A method in accordance with claim 10, wherein separately heating two to about twelve said regeneration stream adjacent radial segments provides said regeneration heat required.

13. A method in accordance with claim 10, wherein separately heating about three to about six said regeneration stream adjacent radial segments provides said regeneration heat required.

14. A method in accordance with claim 10, wherein said regeneration stream adjacent segments are maintained separated by laminar flow of said regeneration stream.

15. A method in accordance with claim 10, wherein no heat is applied to said first segment of said plurality of said regeneration stream adjacent radial segments.

16. A method in accordance with claim 15, wherein reduced heat is applied to said second segment of said plurality of said regeneration stream adjacent radial segments.

17. A method in accordance with claim 10, wherein no heat is applied to the last segment of said regeneration stream adjacent segments contacting said desiccant means as it rotates from said regeneration stream to said process stream.

18. A method in accordance with claim 17, wherein said last segment of said regeneration stream segments is sufficient to remove combustion products produced by said heat source comprising open flame burners.

19. An apparatus for heating a regeneration stream in a thermal regenerative desiccant system having duct means separating a process stream and a regeneration stream through which a desiccant means passes, said desiccant means rotating to cyclically pass through said process stream and said regeneration stream, said regeneration stream providing heat required for regeneration of said desiccant means, said apparatus comprising:
  (a) a plurality of independently controlled heat source means separately heating each of a plurality of regeneration stream adjacent radial segments to a generally constant heat flux, each said heat source means providing heat to one of said regeneration stream adjacent radial segments; and
  (b) control means independently controlling each said heat source means for reducing the total heat provided to said regeneration stream when required to meet heat requirements for regeneration of said desiccant means by reducing heat output only of a first said heat source means to a first segment of said plurality of regeneration stream adjacent radial segments, said first segment first contacting said desiccant means as it rotates from said process stream to said regeneration stream, further reducing heat output of said first heat source means when required to meet heat requirements for regeneration of said desiccant means until no heat is supplied by said first heat source means to said first segment of said plurality of regeneration stream adjacent radial segments; said control means then when required to obtain the reduction in said total heat provided to meet heat requirements for regeneration of said desiccant means, reducing heat output of a second said heat source means to an adjacent second segment of said plurality of regeneration stream adjacent radial segments next contacting said desiccant means as it continues rotation through adjacent said second regeneration stream radial segment, further reducing heat output of said second heat source means when required to meet heat requirements for regeneration of said desiccant means until no heat is supplied by said second heat source means to said second segment of said regeneration stream; and said control means continuing sequentially reducing heat output of further adjacent said heat source means to meet heat requirements for regeneration of said desiccant means to further adjacent segments of said plurality of regeneration stream segments until said regeneration heat required has been provided.

20. An apparatus in accordance with claim 19, wherein said independently controlled heat source comprises an open flame burner within each of said regeneration stream adjacent radial segments.

21. An apparatus in accordance with claim 19, having at least two to about twelve said heat source means.

22. An apparatus in accordance with claim 19, having about three to about six said heat source means.

23. An apparatus in accordance with claim 19 further comprising blower means providing laminar flow to said regeneration stream.

24. An apparatus in accordance with claim 19, further comprising radial partitions maintaining said regeneration stream adjacent radial segments separated.

25. An apparatus in accordance with claim 19, further comprising a radial partition spaced from said duct means to form a last said adjacent radial segment of said regeneration stream last contacting said desiccant means as it rotates from said regeneration stream to said process stream.

26. In an open-cycle air conditioning apparatus for heating and cooling comprising: an enclosure defining a process air passageway and a separate regeneration air passageway; means for passing an air stream through each of said air passageways; a sensible heat exchanger means for transfer of thermal energy from one of said passageways to the other; a rotatable desiccant means for transfer of moisture from the process air stream to the regeneration air stream and spaced toward the exhaust of the regeneration air stream from said heat exchanger means, said regeneration air stream providing heat required for regeneration of said desiccant means; the improvement comprising:
  (a) a plurality of independently controlled heat source means separately heating a plurality of regenerative air stream adjacent radial segments to a generally constant heat flux, each said heat source means providing heat to one of said regenerative air stream adjacent radial segments; and
  (b) control means independently controlling each said heat source means for reducing the total heat provided to said regeneration air stream when required to meet heat requirements for regeneration of said desiccant means by reducing heat output only of a first said heat source means to a first segment of said plurality of regeneration air stream adjacent radial segments, said first segment first contacting said desiccant means as it rotates from said process air stream to said regeneration air stream, further reducing heat output of said first heat source means when required to meet heat requirements for regeneration of said desiccant means until no heat is supplied by said first heat source means to said first segment of said plurality of regeneration stream adjacent radial segments; said control means then when required to obtain the reduction in said total heat provided to meet heat requirements for regeneration of said desiccant means, reducing heat output of a second said heat source means to an adjacent second segment of said plurality of regenerative air stream adjacent radial segments next contacting said desiccant means as said desiccant means continues rotation through adjacent said second regenerative air stream radial segment, further reducing heat output of said second heat source means when required to meet heat requirements for regeneration of said desiccant means until no heat is supplied by said second heat source means to said second segment of said regenerative air stream; and said control means continuing sequentially reducing heat output of further adjacent said heat source means to meet heat requirements for regeneration of said desiccant means to further adjacent segments of said plurality of regenerative air stream segments until said regeneration heat required has been provided.

27. An apparatus in accordance with claim 26, wherein said independently controlled heat source comprises an open flame burner within each of said regeneration stream adjacent radial segments.

28. An apparatus in accordance with claim 26, having at least two to about twelve said heat source means.

29. An apparatus in accordance with claim 26, having about three to about six said heat source means.

30. An apparatus in accordance with claim 26 further comprising blower means providing laminar flow to said regeneration stream.

31. An apparatus in accordance with claim 26, further comprising radial partitions maintaining said regeneration stream adjacent radial segments separated.

32. An apparatus in accordance with claim 26, further comprising a radial partition spaced from said duct means to form a last said adjacent radial segment of said regeneration stream last contacting said desiccant means as it rotates from said regeneration stream to said process stream.

* * * * *